No. 668,161. Patented Feb. 19, 1901.
J. H. CAMPBELL.
CONDENSED MILK AND PROCESS OF OBTAINING SAME.
(Application filed June 30, 1900.)
(No Model.) 2 Sheets—Sheet 1.
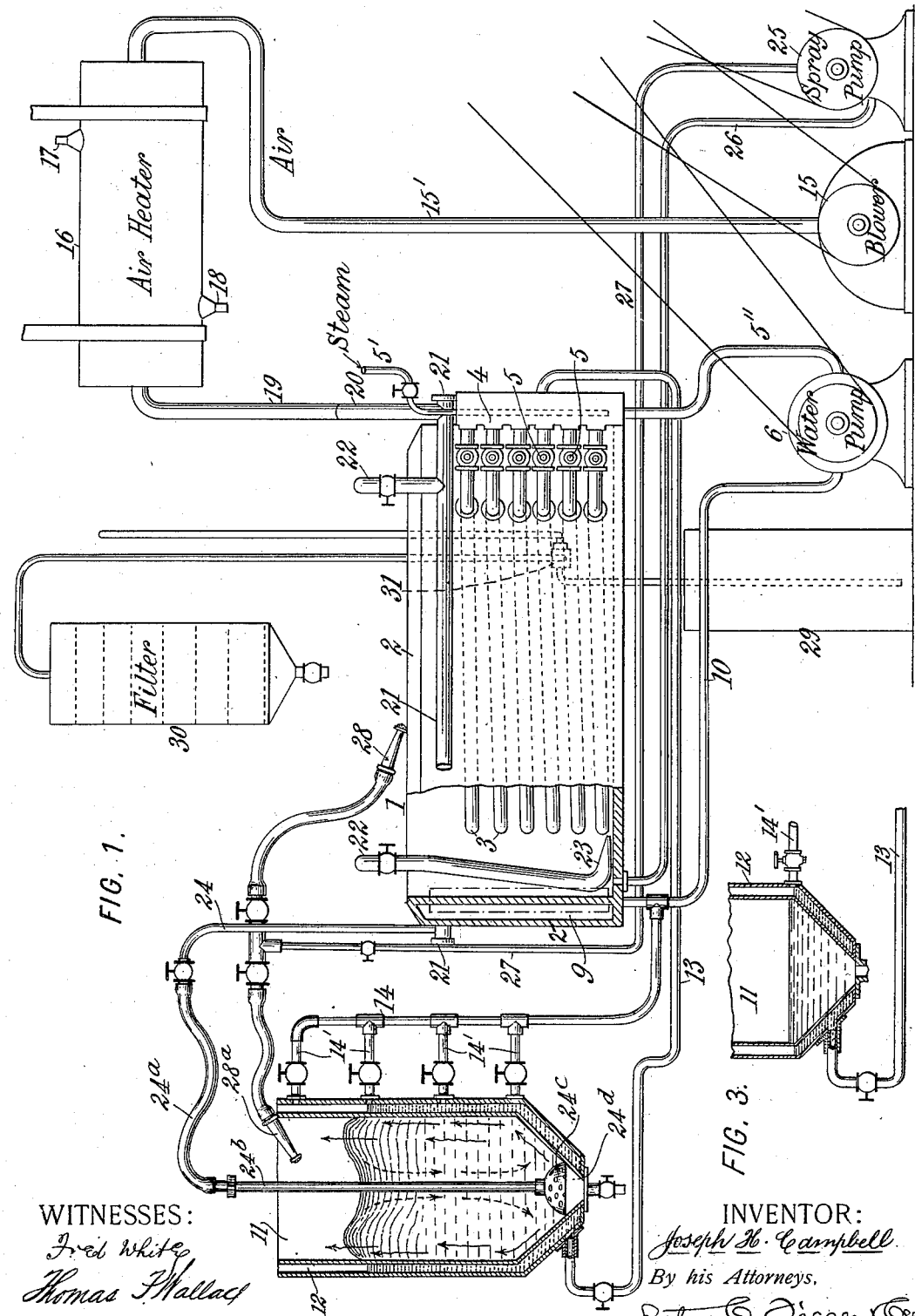
WITNESSES:
Fred White
Thomas F. Wallach
INVENTOR:
Joseph H. Campbell
By his Attorneys,

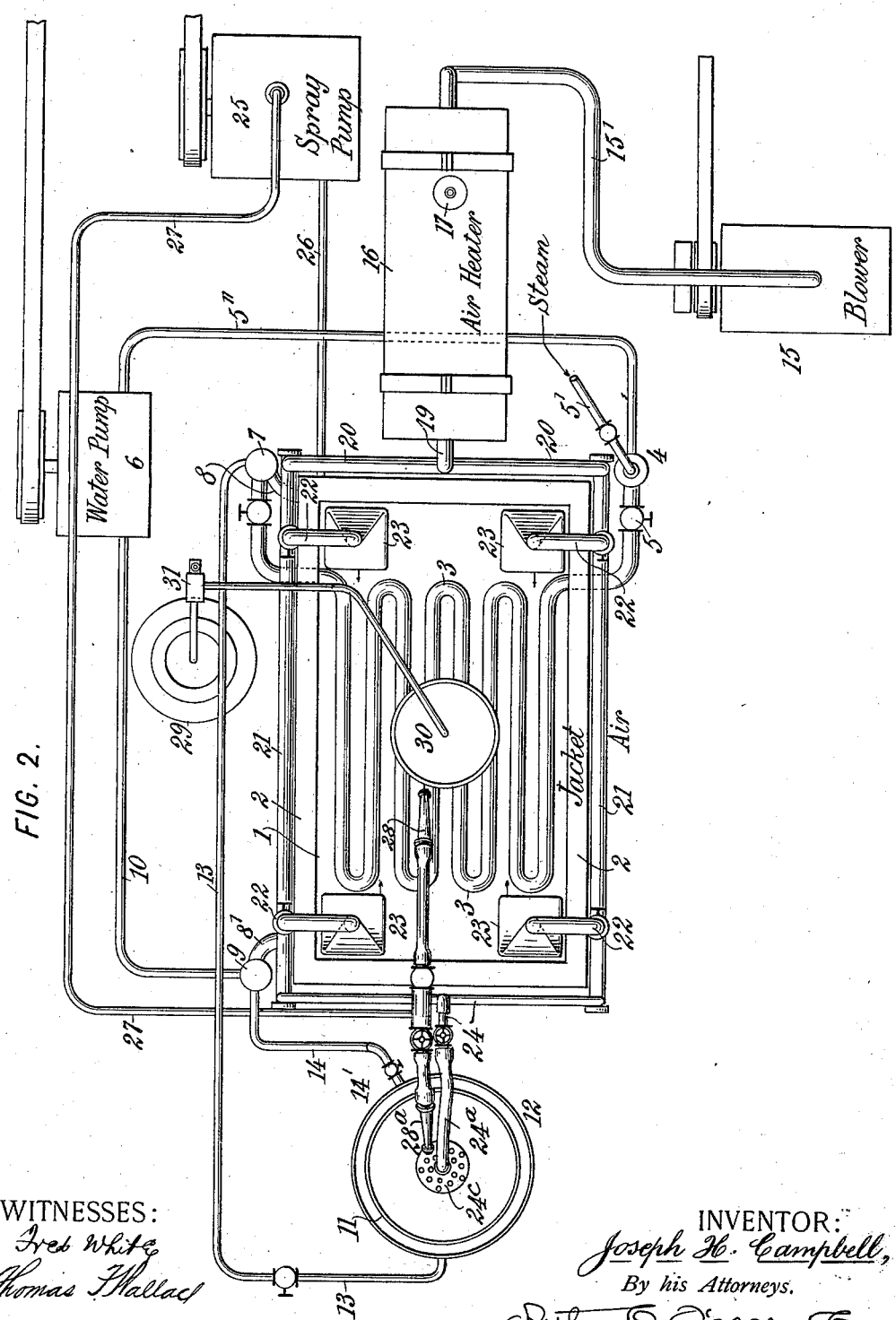

UNITED STATES PATENT OFFICE.

JOSEPH H. CAMPBELL, OF NEW YORK, N. Y.

CONDENSED MILK AND PROCESS OF OBTAINING SAME.

SPECIFICATION forming part of Letters Patent No. 668,161, dated February 19, 1901.

Application filed June 30, 1900. Serial No. 22,105. (No specimens.)

*To all whom it may concern:*

Be it known that I, JOSEPH H. CAMPBELL, a citizen of the United States, residing in the city, county, and State of New York, have invented a certain new and useful Improved Process for the Treatment of Milk and Products Thereof, of which the following is a specification.

This invention relates to the treatment of milk, such as ordinary cow's milk, for the production of a concentrated milk of approximately the consistency of so-called "condensed" milk and to the product of such treatment.

The invention is also applicable to the concentration of substances having similar properties to milk, such as mixtures of milk with other substances.

The leading constituents of milk are water, milk-fat, and non-fatty solids. Cow's milk, for instance, although varying considerably in composition, especially as to the proportion of fat, may be fairly represented by the following analyses:

|  | Blyth. | Vieth. |
|---|---|---|
| Fat | 3.50 | 4.02 |
| Non-fatty solids, viz: | | |
|   Proteids | 4.92 | |
|   Lactose | 4.00 | |
|   Minerals | .70 | |
|  | 9.63 | 8.84 |
| Water | 86.87 | 87.14 |
|  | 100.00 | 100.00 |

The non-fatty solids of milk consist of milk-sugar, proteids, and mineral matters, the latter including potash, soda, lime, magnesia, phosphoric acid, and chlorin. Of the proteids casein is the principal one, amounting in weight to nearly four per cent of normal milk, although other proteids, notably albumen and galactin, are present, aggregating nearly one per cent.

In the ordinary production of condensed milk the milk is evaporated in a vacuum-pan and subjected toward the end of the process to a temperature exceeding 212° Fahrenheit. This protracted high temperature renders the proteids insoluble in water and so changes their character (by rendering the lime salts insoluble) as to make them in great part incapable of yielding peptones under the action of pepsin or rennet—that is, non-peptogenic. Hence all such condensed milk is largely incapable of assimilation. For canned condensed milk it is also common to add a large proportion of sugar, whereby it is rendered objectionably sweet. It has also been attempted to concentrate milk by air injection; but, as far as I am aware, no such processes have been found practicable and no such processes are now in use. These processes have been found either to produce a partially-burned product of objectionable taste or to require such a slow operation that the product is soured, the temperature used being particularly favorable to lactic fermentation. My invention provides an improved process of concentrating milk by exposure to a blast of air which includes several distinct features of improvement and whereby the operation may be carried on at any practical temperature without danger of burning portions of the milk and with any desired rapidity. It provides also for the carrying out of a milk-concentrating process (and specifically of an air-injection process) at a temperature sufficiently below the coagulating-point of albumen to avoid any danger of altering the proteids to render them non-peptogenic. It provides also a condensed-milk product of which the solubility and digestibility of the proteids are undiminished.

Assuming that an average cow's milk of 1031 specific gravity contains 12.5 per cent. of solids, the ordinary condensed milk would contain 37.2 per cent. of milk solids, 36.7 per cent of added sugar, and 26.2 per cent. of water, (Allen.) The condensed milk which is the product of my process consists almost solely of milk solids, there being no added sugar and the free water being reduced to any desired proportion. This milk being readily soluble is easily diluted to reconstitute normal milk. Being peptogenic, it is easily assimilated and constitutes a food product of great value, since it contains all the proteids or nitrogenous substances of the milk in a condition more soluble than in normal milk and no less peptogenic.

By "peptogenic" I mean capable of forming or yielding peptones, (*Standard Dictionary*.) In this peptone-yielding quality the proteids in my product are of substantially the same susceptibility as in ordinary fresh milk in the condition in which it is commonly supplied to consumers. My product is also characterized by being, when dissolved to the consistency of ordinary milk, fully as susceptible to coagulation by rennet as such ordinary milk, whereas condensed-milk products as heretofore prepared have been largely insusceptible to such coagulation.

In operating according to the process of my invention the milk is heated by external means and is maintained at a desired temperature during the concentrating process. In order to effect the concentration, I expose the milk to a blast of air, as by blowing air into the milk in volume depending on the temperature applied and on the desired temperature in the milk, as hereinafter explained. The air circulates through the liquid and takes up moisture therefrom, at the same time agitating the milk. By this means I am able to effect a rapid evaporation at a low temperature. The drier the air the more rapid is the evaporation, and I may provide means for drying the air before it is forced into the milk; but this is not ordinarily necessary, as atmospheric air, unless exceptionally humid, is sufficiently dry for this purpose. If the bubbles of injected air do not readily disengage themselves from the milk, so that foaming results, I break the foam by projecting against it a spray of the milk, which is produced in any desired way. For example, it may be forced under pressure through a nozzle or may be produced by injecting the air into the body of the milk with such violence as to throw the liquid milk above the foam, so that it drops onto the foam and breaks the same. Foaming is also greatly reduced by introducing the air in such direction that it imparts to the entire body of liquid a rolling motion, causing the milk to rapidly circulate and quickly freeing the air-bubbles from the superincumbent liquid. For example, in a cylindrical tank of small diameter the air may be introduced in such a direction that it travels upward along the outer wall and downward at the center, and in an oblong tank the air may be introduced through orifices at the bottom of the tank of milk, the body of air being, preferably, broad and flat and being directed along the bottom from each end to the center, where it rises and produces a current of the milk at the surface from the center toward each end. As the volume of foam, if no steps be taken to check it, is many times that of the liquid itself and as the foam is so tough as to almost entirely prevent the escape of vapor from the milk, the prevention of such a "blanket" is of the greatest importance. The blast of air has also the effect of keeping the milk in constant motion, so that it requires no stirring and insures that the evaporation shall proceed uniformly throughout the mass. The air also has the effect of increasing the solubility of the casein of the milk, a result which may be due to an oxidizing action. I also introduce the air in such direction and at such points as to scour the walls of the vessel and of the coils therein (where coils are used) both by the direct action of the air traveling along the walls and by the current of the liquid flowing over said walls. All the surfaces exposed to the milk are thus kept clean and bright. At a temperature of about 120° there is a tendency of the milk to form a precipitate which tends to deposit on the walls of the vessel and to cake and burn there, injuring the flavor of the product. This tendency increases as the concentration progresses. The agitation and constant circulation of the milk produced by the particular direction of the air-blast, as well as the direct scouring action of the air itself, serve to prevent this deposit regardless of the temperature and are therefore of considerable value in insuring a product free from lumps or burned particles and also in keeping the vessel clean and free from deposit. By directing the air along the walls of the vessel I, in effect, introduce a constant stream of mixed air and milk between the body of milk and the external heating medium. Much of the heat reaches the milk, therefore, through the intermediation of the air, so as to prevent heating too highly the portion of the milk which is nearest to the walls. This enables me to use a very high externally-applied temperature without danger of burning the particles of milk nearest the heated walls.

The air blown through the milk carries off the heated vapor produced by the externally-applied heat and maintains the milk at a temperature below that of the external heat applied. There may be thus maintained a considerable difference between the temperature of the heating medium and the temperature of the milk. In practice I have maintained a difference of 40° Fahrenheit and believe that an even greater difference is possible. This difference in temperature in turn hastens the process, the heat, as it were, running down hill continually into the milk and being carried off with a portion of the vapor by the blast of air. The rapidity of concentration depends largely on the drop in temperature. By reason of the advantages of my method of injecting the air as above set forth I am also enabled to avoid the danger of depositing or otherwise injuring any portion of the milk. I can therefore maintain a considerable drop between the applied temperature and the resultant temperature in the milk, the desired temperature in the milk being obtained by a variation in the volume of the air-blast or in the degree of heat applied.

There is a further difficulty encountered in air-injection processes in the very sticky nature of the milk solids, which causes them to adhere to the walls of the vessel above the general surface of the liquid whenever they are splashed up against such walls by reason of the agitation. These adhering particles are soon cooked by their contact with the hot wall and spoil the taste of the product by becoming mixed in with it or are lost by reason of the difficulty of removing them after they have hardened on the wall. This difficulty I avoid by maintaining the area of application of the heat to the walls below the surface of the milk, so that the walls above such surface are kept cool and the particles lodging thereon are not burned.

For the purpose of producing a condensed milk whose proteids are uninjured, whatever process is used, the milk should not be subjected to a temperature higher than the coagulating-point of albumen, 162° Fahrenheit. For absolute perfection in this respect the temperature should be maintained below even 140° Fahrenheit, the temperature at which coagulation commences or at which a solution of albumen becomes cloudy. The improved air-injection process above described is especially adapted to such a purpose, since it makes it possible to effect concentration at a low temperature, since it can nevertheless be operated with sufficient rapidity, and since it does not introduce further complications, such as caking or burning of a part of the product. In applying this process to the concentration of milk at such a temperature as to avoid injury to the proteids I proceed as follows: The milk is heated by external means, as through a jacket or coils, as above stated, and is maintained at a desired temperature below the coagulating-point of albumen by injecting a blast of air. To secure the best results, the injection of air is proceeded with according to the process outlined above, though the details may be varied somewhat. The process may be carried out from beginning to end with the milk at the same temperature. For the greatest rapidity, however, it would be advisable to maintain as high a temperature as possible at all stages. Thus at the beginning, while the milk is quite dilute, I may without serious injury to the proteids use a temperature equal to that of the complete coagulation of albumen. I may in fact use even a somewhat higher temperature without such serious injury as to destroy the commercial value of the product, even though its actual food value be reduced. As the concentration increases the cogulating-point is lowered, the danger of burning becomes greater, and the temperature should be progressively reduced. This reduction of temperature is most conveniently obtained by reducing the externally-applied temperature. I have found in practice that a range of temperature in the milk from 120° at the beginning of the process to 90° at the end produces good results and with sufficient rapidity to prevent spoiling. The evaporation by air injection is continued until a degree of concentration is reached which varies according to the nature of the product desired. If it is desired to produce condensed milk of the ordinary consistency, this operation is continued until the milk is reduced to from one-third to one-fifth its original weight. The milk is then of the consistency of a thin paste or batter and similar in appearance to ordinary condensed milk, but differs therefrom in that it retains all the original solid constituents of milk unimpaired and that its proteids are in soluble and peptogenic form, so that by merely adding a proportion of water corresponding to that expelled by the evaporating process the milk will be restored to the consistency and condition which it had before the treatment, except that it will contain a larger percentage of soluble proteids.

My process may be performed with either entire or unskimmed milk or with skimmed milk. For the production of condensed milk, and particularly that which is to be used within a few days after its production, I may take the entire milk, in which case the condensed-milk product will contain all the original creamy or fatty matters in addition to the non-fatty solids; but as the butyrin and other fatty matters are very liable to cause fermentation even when the milk is carefully bottled or canned it is preferable for the production of condensed milk which is to be kept for any considerable time that skimmed milk be used. For a condensed milk that is to be sent to tropical climates it is almost imperative that the milk be skimmed.

One important advantage of my invention is that my evaporating process, nothwithstanding the low temperature which is used, tends to sterilize the product. Many deleterious microbes are destroyed by long-continued oxidation, by persistent agitation, and also by desiccation. My process effectively combines all three agencies, since by the injection of air an oxidizing action is exerted throughout every particle of the material. The air also maintains a most effective agitation of the mass, which is continued until the material reaches such density as to be insusceptible thereto, while the action of the injected air is to take up moisture from all portions of the material, and thereby to partially deprive the microbes of moisture. To assist in insuring a sterilized product, I may employ sterilized air, the air being sterilized by previously heating it before injection or in any other known way. In the case of condensed milk this sterilizing action of the process enables me to prepare it for canning without raising its temperature to what is commonly considered the sterilizing-point, a point which exceeds the coagulating temperature of albuminoids. To do this, I need only conduct the condensed milk directly from the evaporating vessel through a sterilized conduit into sterilized cans contained in a sterilized chamber, the cans being closed by any known means for effecting hermetic closure without access of air.

In the concentration of mixtures of milk with other substances it is equally desirable to obtain products of which the milk solids are uninjured. The process of my invention is designed to be used in concentrating such mixtures, as well as in concentrating pure milk. It will be understood, therefore, that by the term "milk" I mean to include all substances having in a substantial degree the qualities of milk, such as mixtures containing a substantial percentage of milk.

Having thus indicated the nature of my improved process and product, I will proceed to describe in detail what I believe to be the preferable way of practicing my invention upon a commercial scale, and for this purpose I will refer to the accompanying drawings, which illustrate a suitable form of apparatus adapted for use in practicing my invention.

Figure 1 of the accompanying drawings is a side elevation of said apparatus, partially in vertical section. Fig. 2 is a plan thereof, and Fig. 3 is a detail showing the relation of certain parts after the concentration has been effected.

Referring to the drawings, let 1 designate a main tank having external heating means, such as a jacket 2 and heating-coils 3 3 therein. Steam or hot water is supplied from a stand-pipe or header 4 to one, two, or more of the coils, as controlled by valves 5 5. Steam from a suitable source is delivered by pipe 5', which discharges within the pipe 4 near its bottom. Water is introduced into this pipe from a pump 6 by pipe 5'', and the entering water is heated by the steam. The water after passing through the coils 3 3 enters a second like pipe or header 7, from which the greater portion of the water flows through a short pipe 8 into the jacket 2 of the tank, and from this jacket it passes out by pipe 8' into a third header or stand-pipe 9, from which a pipe 10 conducts it back to the pump 6. Thus a continuous circulation of water of suitable temperature is maintained through the coils and jacket of the tank. A second or supplemental tank 11 is provided, having a jacket 12 and supplied with hot water through a valved pipe 13, a pipe 14 leading the water back to the pipe 10. Valved branch pipes 14' at intervals in the height of the tank serve to keep the water therein at any desired level, so as to maintain it below the constantly-falling level of the milk.

A blower 15 is provided, which forces air under pressure through a pipe 15' into an air-heater 16, which may be heated by steam admitted at 17 and the water of condensation drained off at 18. The hot-air-outlet pipe 19 from this heater leads to branch pipes 20 and thence to pipes 21, extended along the sides of the tank 1. From these pipes lead branches or goosenecks 22, which extend down within the tank and terminate in flat nozzles 23, placed at the ends of the tank at or near the bottom thereof and each adapted to direct the air toward the opposite end of the tank. Another air-supply pipe 24 leads from the pipes 21 into the auxiliary tank 11, where it is preferably connected by a flexible hose 24ª with a stand-pipe 24ᵇ, which passes down through the middle of the tank and is formed on its lower end with a disk or flange 24ᶜ, constituting a hollow foot. The pipe 24ᵇ is removable for cleansing, and when in place its disk $f$ fits against the conical wall of the tank and forms beneath it an air-chamber 24ᵈ. A spray-pump 25 is also provided, which draws milk from the bottom of the tank 21 by pipe 26 and forces it through a pipe 27, which has a branch nozzle 28 for throwing spray into the tank 1 and another branch nozzle 28ª for throwing spray into the tank 11.

29 designates a tank for receiving the milk to be treated. 31 is a steam-siphon or other lift-pump for elevating the milk therefrom to a filter 30, the latter being located above the main tank 1. This filter may be packed with sand and fibrous material.

I will now describe the process as performed by this apparatus.

The milk to be treated is first placed in tank 29, from which it is drawn by the steam-siphon 31 and discharged into the filter 30. The steam which is thus commingled with the milk serves to dilute it and to heat it. I heat it, preferably, to 100° Fahrenheit, or thereabout, the temperature being readily controllable according to the relative amounts of steam and milk admitted to the filter. The object of heating and diluting the milk is to separate the particles of casein, prevent their becoming flocculent, and render them soluble by the action of the water and the air-blast in the subsequent stages of the process. In passing through the filter the milk is freed from all solid impurities and is discharged into the main tank. In this tank the milk, if not perfectly fresh, may be treated with a small amount of alkaline solution, preferably one-half an ounce or less of bicarbonate of soda to one hundred pounds of milk or about sufficient to restore to the milk the alkaline properties it had when fresh. Throughout the process the proper temperature, approximating 100° to 120° Fahrenheit, but which may rise to the point of complete coagulation of albumen—162° Fahrenheit—or even somewhat higher at times without serious injury, is maintained by the circulation of hot water in the coils 3 3 and jacket 2 of the tank, the temperature being regulated by admitting more or less steam through the pipe 5'. The air-blast is turned on by opening suitable valves in the air-pipes, the blower having been previously started. The air is thus forced into the milk through the nozzles 23 and sweeps along the bottom of the tank and rises through the mass of milk, thereby setting up a rolling motion thereof and escaping therefrom, with the effect of violent ebullition. The entire mass is thus maintained in agitation, and the contained water of the milk is taken up as vapor into the bubbles of air and carried off.

The temperature in the jacket and coils being considerably higher than that of the milk in the tank, there is a constant tendency of the milk adjacent to the walls to deposit a thin coating of milk solids thereon, which quickly results by reason of the non-conducting properties of such coating in obstructing the escape of heat into the liquid, and the imprisoned heat then acts to bake it upon the surface. This baking or incrustation is accompanied by a browning or discoloration of the milk solids, affecting the milk-sugar and probably the casein and rendering the latter insoluble and non-peptogenic. The incrustation and discoloration are prevented by the air-blast, the greater portion of which is directed against and along the inner surfaces of the tank, so as to exert a scouring action thereagainst and maintain a partial separation of the milk therefrom. The direction of the air-blast causes also a forcible circulation of the milk, which assists in keeping all the heated surfaces scoured clean and bright.

By reason of the fact that the air travels along the heated walls and maintains a certain degree of separation of the milk therefrom I am enabled to use a temperature in the tank considerably higher than would otherwise be the case and so hasten the process without danger of injuring the solubility and peptogenic qualities of the product by overheating. The greater the drop or difference of temperature between the milk and the heating medium the more rapid is the process, and as the milk nearest the walls is in the greatest danger of being too highly heated the passage of the greatest volume of the air in the same neighborhood enables me to use a higher temperature in the jacket and coils than if the air were equally distributed throughout the milk. In practice I find, therefore, that I can use a temperature in the jacket and coils many degrees higher than that which would be injurious in the milk, the degree being apparently limited only by the available volume of air.

In order to prevent the milk which splashes up onto the walls from burning and thus discoloring the product, it is necessary to keep the walls comparatively cool above the surface of the milk, and this is accomplished by keeping the water in the jacket and coils at or below the level of the milk. This feature is more essential in the latter part of the concentration, and since I carry out such part in the small tank 11 I have shown only in said tank means for controlling the level of the water. In case during this concentrating process any objectionable degree of foaming occurs the spray-pump 25 may be set in operation and spray from the nozzle 28 directed over or into the top of the tank to break up the foam and liberate the air.

After the milk has been reduced to a suitable consistency, preferably to about fifty per cent. of its original volume, it is transferred to the auxiliary tank 11, where it is further reduced by continuing the same process. Figs. 1 and 2 show this stage of the process. This transfer is not essential and is resorted to solely as a convenience in order to continue the treatment of the reduced bulk of material in a smaller tank and leave the larger tank free for treating a fresh batch of material, and also in order that in working the thicker or more concentrated material a tank may be used which does not contain the internal heating-coils 3 3 and air-discharge nozzles 23, which obstruct the interior of the larger tank and would interfere with the drawing off of the thicker product. In this auxiliary tank the temperature is maintained by circulating hot water through the jacket 12, and the evaporation is continued by introducing air through the pipe $24^b$ beneath the perforated disk $24^c$, so that the air bubbles up through the perforations in this disk, and if too much foaming results spray is admitted through the pipe $28^a$. The action of the layer of air in preventing the burning of the portions of the milk nearest the walls is especially noticeable at this stage by reason of the increased tendency of the milk to burn as it becomes more concentrated. The air passing through the pipe $24^b$ expels the milk or most of it from the chamber $24^d$ and escapes through the perforations and around the edges of the disk $24^c$ and passes up through and around the mass of milk, as shown by the full-line arrows, Fig. 1. The greater part of the air will pass up along the walls of the tank, thereby setting the milk into upward circulation along its outer portion and causing it to work down toward the center, as shown by the dotted arrows, thus maintaining a rolling motion or rotary circulation of the mass of milk by which the air-bubbles, which permeate the liquid, are constantly set free, and hence the tendency of the mass to foam is greatly reduced. In order to maintain the level of the water in the jacket below that of the milk in the tank to prevent the burning of particles splashed up on the wall, I open the cock in the branch pipe 14' next below the level of the milk, as shown. The air injection, accompanied by the heating of the milk from the jacket, is continued until the desired density is reached, which is for a condensed milk ordinarily about one-third of its original weight or to the consistency of a thin paste. The temperature in the milk at the same time is preferably reduced from about 120° Fahrenheit to between 90° and 100° and that in the jacket from 150° to 125° Fahrenheit. If the air-blast be maintained constant, a gradual reduction of temperature takes place automatically by reason of the reduced heating-surface as the volume of the milk diminishes. The process is then stopped, preferably by shutting off the hot water and continuing the air injection, which rapidly cools the milk. The pipe $24^b$ is then withdrawn (see Fig. 3) and the milk may be drawn off by the bottom cock at any convenient time.

Though I have described with great particularity of detail a process embodying my invention, I am not to be understood as limiting myself to the specific features described, since they are obviously capable of modification by those skilled in the art without departing from the spirit of my invention. Thus the preliminary heating and dilution of the milk may be omitted.

The apparatus herein described is not claimed in the present application, though I am not to be understood as abandoning my right to claim the same in a separate application.

One of the most important applications of my present process is as the first stage in the process of desiccating milk described in my application for patent on a process of desiccating milk, Serial No. 8,979, filed March 16, 1900.

It will be understood that by the term "externally applied heat" I mean to distinguish from heat applied by placing the heating medium in direct contact with the milk—as, for example, by blowing hot air through the milk. The term refers, therefore, to heat applied by means of coils as well as by means of a surrounding jacket, the metal of the coils being in the sense contemplated a wall of the vessel.

I claim as my invention the following-defined novel features, substantially as hereinbefore specified, namely:

1. The process of treating milk which consists in heating it to a temperature maintained below the coagulating-point of albumen, and simultaneously concentrating it by blowing air into it in such volume that it is concentrated so rapidly as to prevent souring, and its proteids are preserved in soluble and peptogenic condition.

2. The process of treating milk which consists in heating it to a temperature maintained below the coagulating-point of albumen, and simultaneously concentrating it by blowing air into it in such volume that it is concentrated so rapidly as to prevent souring and until it is reduced to approximately one-third or less of its original weight, as and for the purposes set forth.

3. The process of treating milk which consists in subjecting it to externally-applied heat to maintain it at a temperature below the coagulating-point of albumen, and simultaneously blowing into it sterilized air in such volume that it is concentrated so rapidly as to prevent souring and until the milk is concentrated to approximately one-third or less of its original weight, as and for the purposes set forth.

4. The process of treating milk which consists in concentrating it by blowing air into it in such direction as to set the liquid mass in circulation with a rolling motion, whereby the disengagement of the air-bubbles is facilitated and foaming reduced.

5. The process of treating milk which consists in concentrating it by blowing air into it, and simultaneously projecting a liquid spray against the foaming surface of the liquid to break the foam.

6. The process of treating milk which consists in applying externally thereto a temperature below the coagulating-point of albumen, and simultaneously blowing air thereinto at such a temperature and in such volume as to maintain the temperature of the milk materially below that communicated by the external heating medium, as and for the purposes set forth.

7. The process of treating milk which consists in applying externally thereto a temperature below 140° Fahrenheit, and simultaneously blowing air thereinto at such a temperature and in such volume as to maintain the temperature of the milk below about 120° Fahrenheit, whereby the concentration is so rapid as to prevent souring of the milk, the proteids are preserved in soluble and peptogenic condition, and the precipitation of milk solids is avoided.

8. The process of treating milk which consists in applying heat thereto to vaporize the water thereof, and simultaneously blowing air thereinto in sufficient volume to carry off heat from the liquid at substantially the same rate as the heat is applied thereto, and to keep the milk below 140° Fahrenheit, whereby the contained water is rapidly vaporized at so low a temperature as not to injuriously affect the milk solids.

9. The process of treating milk which consists in applying heat externally thereto, simultaneously blowing air thereinto, and gradually reducing the resultant temperature of the milk as the water thereof is evaporated, as and for the purposes set forth.

10. The process of treating milk which consists in applying heat externally thereto, simultaneously blowing air thereinto, and gradually reducing the temperature externally applied as the water thereof is evaporated.

11. The process of treating milk which consists in heating it to a temperature maintained below the coagulating-point of albumen and simultaneously concentrating it by exposure to a blast of air in such volume that it is concentrated so rapidly as to prevent souring and its proteids are preserved in soluble and peptogenic condition.

12. The process of treating milk which consists in heating it to a temperature maintained below the coagulating-point of albumen and simultaneously concentrating it by blowing air into it in such volume that it is concentrated so rapidly as to prevent souring and its lime salts and other mineral matters are preserved in their original condition as to solubility.

13. The process of treating milk which consists in concentrating it by heating it and blowing air into it in such direction as to scour the heating-walls of the vessel and thereby prevent the accumulation of a deposit of milk solids on said walls.

14. The process of treating milk which consists in applying thereto a temperature below the coagulating-point of albumen, and simultaneously introducing air thereinto in such volume and direction as to prevent by agitation the accumulation of a deposit of milk solids on the heating-walls of the vessel.

15. The process of treating milk which consists in applying heat externally thereto, simultaneously blowing air thereinto, and as the volume of milk decreases maintaining the area of application of the heat below the surface of the milk.

16. The process of treating milk which consists in applying heat externally thereto, and maintaining the same at a temperature below the coagulating-point of albumen by blowing air thereinto, the greatest volume of air being introduced in such a direction as to travel in proximity to the heating-walls whereby the portion of milk nearest the heating medium is subjected to the action of the greatest volume of air, and a high external temperature is possible without exceeding the desired temperature in any portion of the milk.

17. The described product, being a product containing condensed milk, the soluble and peptogenic qualities of the proteids of the milk being undiminished.

18. The described milk product, being a condensed milk, the soluble and peptogenic qualities of the proteids of the milk being undiminished.

19. The described milk product, being a condensed milk, the proteids of the milk being in a condition more soluble in water than in normal milk, and no less peptogenic.

In witness whereof I have hereunto signed my name in the presence of two subscribing witnesses.

JOSEPH H. CAMPBELL.

Witnesses:
   DOMINGO A. USINA,
   FRED WHITE.